(12) United States Patent
Kinomura

(10) Patent No.: US 9,493,086 B2
(45) Date of Patent: Nov. 15, 2016

(54) CHARGING SYSTEM AND CHARGING RESERVATION METHOD

(75) Inventor: Shigeki Kinomura, Suntou-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/358,830

(22) PCT Filed: Nov. 21, 2011

(86) PCT No.: PCT/JP2011/076807
§ 371 (c)(1),
(2), (4) Date: May 16, 2014

(87) PCT Pub. No.: WO2013/076792
PCT Pub. Date: May 30, 2013

(65) Prior Publication Data
US 2014/0306658 A1    Oct. 16, 2014

(51) Int. Cl.
*H02J 7/00* (2006.01)
*B60L 11/18* (2006.01)

(52) U.S. Cl.
CPC ........ *B60L 11/1824* (2013.01); *B60L 11/1838* (2013.01); *H02J 7/0027* (2013.01); *Y02T 10/7005* (2013.01); *Y02T 10/7055* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
USPC .......................................................... 320/109
See application file for complete search history.

(56) References Cited

U.S. PATENT DOCUMENTS

| 2010/0164439 | A1 | 7/2010 | Ido |
| 2010/0217485 | A1 | 8/2010 | Ichishi |
| 2011/0246252 | A1* | 10/2011 | Uesugi ..................... B60L 3/12 705/7.12 |
| 2012/0112696 | A1 | 5/2012 | Ikeda et al. |

FOREIGN PATENT DOCUMENTS

| JP | A-2009-136109 | 6/2009 |
| JP | A-2010-104114 | 5/2010 |
| JP | 2010-154646 A | 7/2010 |
| JP | 2010-288345 A | 12/2010 |
| WO | 2011/007573 A1 | 1/2011 |

* cited by examiner

*Primary Examiner* — Robert Grant
(74) *Attorney, Agent, or Firm* — Oliff PLC

(57) ABSTRACT

A house-side ECU executes a program including the steps of, if a charging cable is being connected, if a vehicle can be externally charged by a reservation, and if there is reservation information by a user's input in the vehicle, receiving the reservation information from the vehicle, and if there is reservation information based on a state of the vehicle in the vehicle, receiving the reservation information from the vehicle, selecting one of the reservation information, and making a notification of the reservation information.

10 Claims, 8 Drawing Sheets

FIG.4

<HOUSE-SIDE RESERVATION TABLE>

|   | START TIME | END TIME | ATTRIBUTE |
|---|---|---|---|
| 1 |  |  |  |
| ⋮ | ⋮ | ⋮ | ⋮ |

FIG.5

<VEHICLE-SIDE RESERVATION TABLE>

|   | START TIME | END TIME | ATTRIBUTE |
|---|---|---|---|
| A |  |  |  |
| ⋮ | ⋮ | ⋮ | ⋮ |

CHARGING SYSTEM AND CHARGING RESERVATION METHOD

TECHNICAL FIELD

The present invention relates to a technique of charging a vehicle-mounted power storage device using a charging apparatus outside of a vehicle in accordance with reservation information.

BACKGROUND ART

Japanese Patent Laying-Open No. 2010-104114 (Patent Document 1), for example, discloses a vehicle performing charging control using a charging apparatus outside of the vehicle by adjusting a charging schedule of a vehicle-mounted power storage device.

CITATION LIST

Patent Document

PTD 1: Japanese Patent Laying-Open No. 2010-104114

SUMMARY OF INVENTION

Technical Problem

When making a reservation for charging of a vehicle-mounted power storage device using a charging apparatus outside of a vehicle (e.g., a charging apparatus installed in a house), the charging reservation may be made on the vehicle side, or the charging reservation may be made on the charging apparatus side. If a charging reservation is made in both the vehicle and the charging apparatus, however, it is challenging to determine how to handle them. In the vehicle disclosed in the aforementioned publication, the charging schedule is managed on the vehicle side, and such a problem is not considered.

An object of the present invention is to provide a charging system and a charging reservation method for appropriately adjusting charging reservations when the reservation is made in both a vehicle and a charging apparatus.

Solution to Problem

A charging system according to an aspect of the present invention includes a first control device provided in a vehicle for controlling external charging of a power storage device mounted on the vehicle by a power supply outside of the vehicle, and a second control device provided in a charging apparatus outside of the vehicle for controlling the external charging. When a reservation for the external charging has been made in both the first control device and the second control device in this charging system, the external charging is performed by giving the reservation in the second control device a higher priority than the reservation in the first control device.

Preferably, when a reservation for the external charging has been made in both the first control device and the second control device, and when the reservation in the first control device has been made at a request based on a state of the vehicle which is different from a request by a user, the external charging is performed by giving the reservation in the first control device a higher priority than the reservation in the second control device.

More preferably, when a reservation for the external charging has been made in both the first control device and the second control device, and when the reservation in the first control device has been made before communication between the first control device and the second control device becomes possible, the external charging is performed by giving the reservation in the first control device a higher priority than the reservation in the second control device.

More preferably, when the reservation in the first control device is given a higher priority, charging and discharging of the power storage device is allowable within a range where the external charging by the reservation in the first control device can be completed.

More preferably, at least one of the vehicle and the charging apparatus is provided with a notification device for making a notification of which one of the reservation in the first control device and the reservation in the second control device has been given a higher priority.

More preferably, when a reservation for the external charging has been made, the first control device cancels the reservation in the first control device while transmitting reservation information to the second control device when communication with the second control device becomes possible.

More preferably, the first control device generates the reservation information such that the reservation in the first control device can be distinguished between a reservation based on a request by a user and a reservation based on a state of the vehicle.

More preferably, the charging apparatus is part of an electric power management system for adjusting an amount of power used by at least one of a plurality of electrical devices connected to the power supply.

A charging reservation method according to another aspect of the present invention is a charging reservation method using a first control device provided in a vehicle for controlling external charging of a power storage device mounted on the vehicle by a power supply outside of the vehicle, and a second control device provided in a charging apparatus outside of the vehicle for controlling the external charging. This charging reservation method includes the steps of, when a reservation for the external charging has been made in both the first control device and the second control device, selecting and giving a higher priority to the reservation in the second control device than the reservation in the first control device, and performing the external charging in accordance with the selected reservation.

Advantageous Effects of Invention

According to the present invention, when a reservation for the external charging has been made in both the first control device and the second control device, the external charging is performed by giving the reservation in the second control device a higher priority than the reservation in the first control device. Thus, when the charging apparatus is part of an electric power management system, the external charging can be appropriately coordinated with another power control performed on the charging apparatus side other than the external charging. Therefore, a charging system and a charging method for appropriately adjusting charging reservations when the reservation is made in both the vehicle and the charging apparatus can be provided.

BRIEF DESCRIPTION OF DRAWINGS

FIG. 4 shows an example of reservation information stored in a memory of a house-side ECU.

FIG. 5 shows an example of reservation information stored in a memory of a vehicle-side ECU.

DESCRIPTION OF EMBODIMENTS

Figure 1:
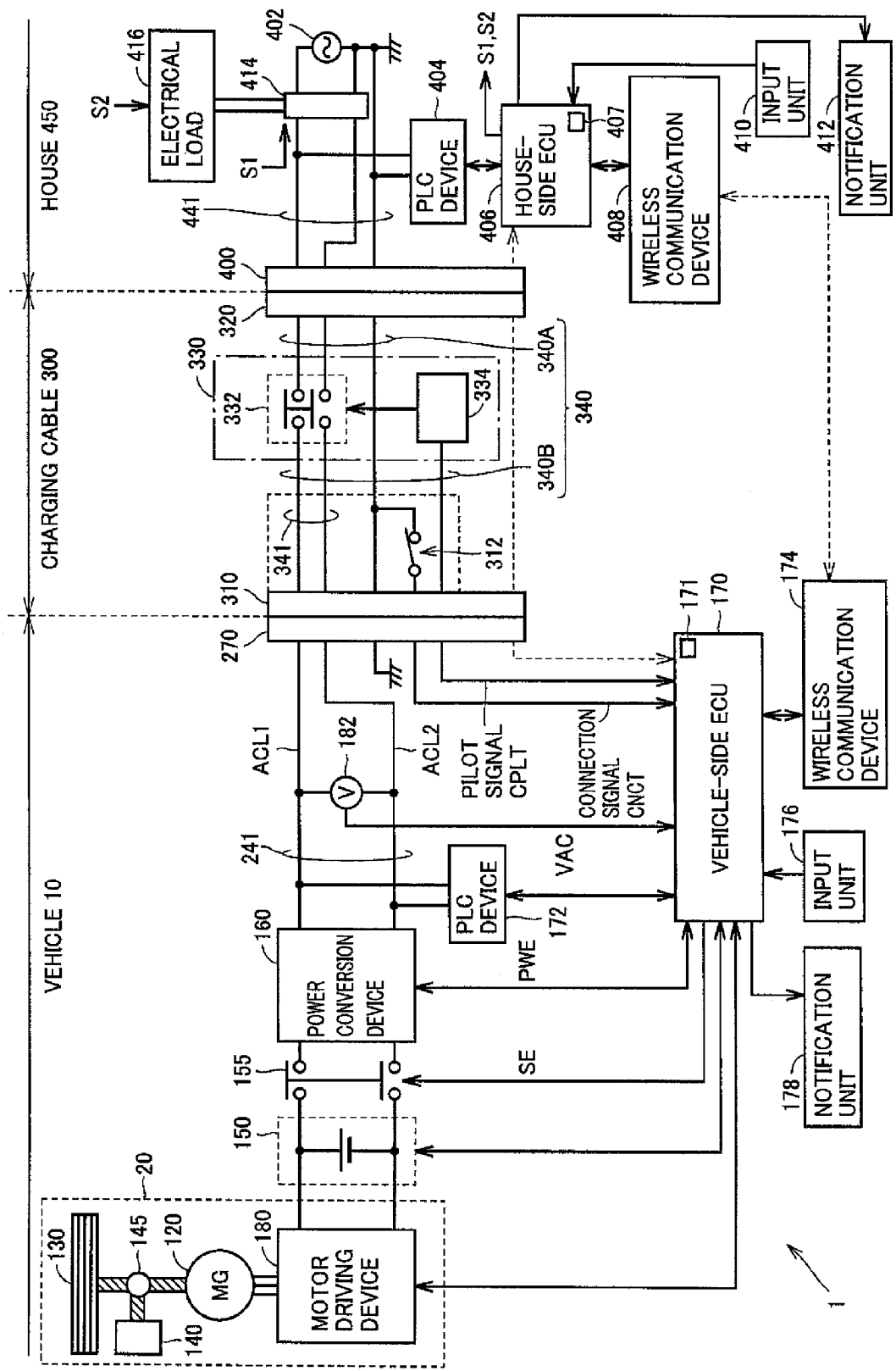
FIG. 1 is an overall block diagram of a charging system according to an embodiment.

An embodiment of the present invention will be described hereinafter with reference to the drawings, in which the same components are designated by the same reference characters, and their names and functions are also identical. Thus, the detailed description thereof will not be repeated.

As shown in FIG. 1, a charging system 1 according to this embodiment includes a vehicle 10, and a house 450 serving as a charging apparatus provided outside vehicle 10. Vehicle 10 and house 450 are connected together by a charging cable 300.

The configuration of vehicle 10 is not particularly limited as long as vehicle 10 can travel with electric power from a chargeable power storage device. Examples of vehicle 10 include a hybrid vehicle and an electric vehicle. The present invention is also applicable to any vehicle having a chargeable power storage device mounted thereon, such as a vehicle that travels by an internal combustion engine and a fuel cell vehicle.

Vehicle 10 includes an inlet 270, a power conversion device 160, a relay 155, a power storage device 150, a driving unit 20, a vehicle-side ECU (Electronic Control Unit) 170, a first PLC (Power Line Communications) device 172, a wireless communication device 174, an input unit 176, a notification unit 178, and a voltage sensor 182.

Driving unit 20 includes a motor driving device 180, a motor generator (hereinafter also referred to as "MG") 120, a drive wheel 130, an engine 140, and a power split device 145.

Inlet 270 is connected to a connector 310 provided in charging cable 300.

Power conversion device 160 is connected to inlet 270 by power lines ACL1 and ACL2. Power conversion device 160 is connected to power storage device 150 through relay 155. In response to a control signal PWE from vehicle-side ECU 170, power conversion device 160 converts AC power supplied from a system power supply 402 of house 450 to DC power capable of charging power storage device 150, and supplies the DC power to power storage device 150.

Power storage device 150 is an electric power storage component configured in a chargeable/dischargeable manner. Power storage device 150 includes a secondary battery such as a lithium-ion battery, a nickel-metal hydride battery or a lead-acid battery, or a power storage element such as an electric double layer capacitor.

Power storage device 150 stores the DC power supplied from power conversion device 160. Power storage device 150 is connected to motor driving device 180 that drives MG 120. Power storage device 150 supplies DC power used for the generation of driving power for running the vehicle. Power storage device 150 stores electric power generated by MG 120.

Although not shown, power storage device 150 further includes a voltage sensor for detecting a voltage of power storage device 150, and a current sensor for detecting a current input to and output from power storage device 150. The voltage sensor transmits a signal indicating a detected voltage to vehicle-side ECU 170. The current sensor transmits a signal indicating a detected current to vehicle-side ECU 170.

Motor driving device 180 is connected to power storage device 150 and MG 120. Motor driving device 180 is controlled by vehicle-side ECU 170, and converts electric power supplied from power storage device 150 to electric power for driving MG 120. Motor driving device 180 includes a three-phase inverter, for example.

MG 120 is connected to motor driving device 180, and to drive wheel 130 with power split device 145 interposed therebetween. MG 120 receives the electric power supplied from motor driving device 180, to generate driving power for running vehicle 10. MG 120 also receives a torque from drive wheel 130 and generates AC power, to generate regenerative braking power. Vehicle-side ECU 170 controls the regenerative braking power by transmitting to motor driving device 180 a regenerative torque command value which is generated in accordance with a state of vehicle 10. MG 120 is, for example, a three-phase AC motor generator including a rotor into which a permanent magnet is embedded, and a stator having a Y-connected three-phase coil.

MG 120 is also connected to engine 140 with power split device 145 interposed therebetween. Vehicle-side ECU 170 controls vehicle 10 such that a ratio of driving power of engine 140 and MG 120 is optimal. MG 120 is driven by engine 140 to operate as a power generator. Electric power generated by MG 120 is stored in power storage device 150. The electric power generated by MG 120 may be supplied together with the electric power in power storage device 150 through inlet 270 to electrical devices connected to system power supply 402 of house 450.

Voltage sensor 182 is connected between power lines ACL1 and ACL2, and detects a voltage VAC between power lines ACL1 and ACL2. Voltage sensor 182 transmits a signal indicating voltage VAC to vehicle-side ECU 170.

Relay 155 is inserted into a path that connects power conversion device 160 to power storage device 150. Relay 155 is controlled by a control signal SE from vehicle-side ECU 170, and switches between supply and interruption of electric power between power conversion device 160 and power storage device 150. Although relay 155 is provided separately from power storage device 150 or power conversion device 160 in this embodiment, it may be included in power storage device 150 or power conversion device 160.

Vehicle-side ECU 170 includes a CPU (Central Processing Unit) (not shown in FIG. 1), and a memory 171 having the function of a storage device, an input/output buffer or the like. Vehicle-side ECU 170 receives signals from various sensors and the like and transmits control commands to various devices, and controls vehicle 10 and the various devices. Such control is not limited to software processing, but may be processed by constructing dedicated hardware (electronic circuitry).

Vehicle-side ECU 170 receives a connection signal CNCT and a pilot signal CPLT through inlet 270 from charging cable 300. Vehicle-side ECU 170 receives a detection value of voltage VAC from voltage sensor 182.

Vehicle-side ECU 170 receives detection values of current, voltage and temperature from sensors (not shown) provided in power storage device 150, and calculates an SOC (State of Charge) indicating a remaining amount of power in power storage device 150.

Based on these pieces of information, vehicle-side ECU 170 controls power conversion device 160, relay 155 and the like so as to charge power storage device 150.

First PLC device 172 is connected to power lines 241. First PLC device 172 conducts power line communication with a second PLC device 404 connected to power lines 441 in house 450. In the power line communication between first PLC device 172 and second PLC device 404, power lines 241, 341 and 441 are utilized as communication paths. The power line communication between first PLC device 172 and second PLC device 404 becomes possible when charging cable 300 is connected to both vehicle 10 and house 450, namely, when an outlet 400 and a plug 320 are connected together and connector 310 and inlet 270 are connected together.

First PLC device 172 includes a modem, for example. When first PLC device 172 receives a high-frequency signal through power lines 241 from second PLC device 404 in house 450, first PLC device 172 demodulates data from the received high-frequency signal. First PLC device 172 transmits the demodulated data to vehicle-side ECU 170.

When first PLC device 172 receives data from vehicle-side ECU 170, first PLC device 172 modulates the received data into a high-frequency signal. First PLC device 172 outputs the modulated high-frequency signal to power lines 241.

If the AC power of system power supply 402 has a frequency of 50 Hz or 60 Hz, for example, the high-frequency signal exchanged between first PLC device 172 and second PLC device 404 during the power communication has a frequency of several MHz to several tens of MHz, for example.

Wireless communication device 174 conducts wireless communication with a wireless communication device outside of vehicle 10. In this embodiment, wireless communication device 174 conducts wireless communication with a wireless communication device 408 in house 450.

Although wireless communication standards such as Zigbee (registered trademark), Bluetooth (registered trademark), IEEE 802.11, or infrared communication and the like are used in the wireless communication, these standards are not particularly limiting.

Input unit 176 is an interface for receiving instructions from a user in vehicle 10. Input unit 176 transmits a signal corresponding to an instruction received from the user to vehicle-side ECU 170.

In this embodiment, input unit 176 receives input of information about a start time and/or an end time of external charging desired by the user (hereinafter referred to as reservation information), for example. In this embodiment, the external charging refers to charging of power storage device 150 of vehicle 10 using system power supply 402. Operation of the external charging depending on the presence or absence of reservation will be described later.

The reservation information can be input by, for example, direct input of a numerical value corresponding to the time, input to change a time displayed on a display device to a desired time, input to select one of a plurality of times displayed on the display device, input with a remote controller or a mobile terminal, and the like.

Input unit 176 may consist of a button, a dial and the like, may consist of an icon and the like displayed on a touch panel, or may be a reception device that receives data including the reservation information from a remote controller or a mobile terminal, for example.

In this embodiment, vehicle-side ECU 170 determines the reservation information based on the signal from input unit 176, and causes memory 171 to store the determined reservation information.

Notification unit 178 notifies the user in vehicle 10 of prescribed information. In this embodiment, notification unit 178 notifies the user of prescribed information by using a display device consisting of an LCD (Liquid Crystal Display), an LED (Light Emitting Diode) and the like. Notification unit 178 may notify the user of the prescribed information by, for example, using a sound generation device that generates sound or voice.

Charging cable 300 includes connector 310 provided at the end closer to the vehicle, plug 320 provided at the end closer to the system power supply, a charging circuit interrupt device (hereinafter also referred to as "CCID") 330, and a power line portion 340 that connects the various devices together to input and output electric power and control signals. Charging cable 300 may be included in vehicle 10 or in house 450.

Power line portion 340 includes a power line portion 340A that connects plug 320 and CCID 330 together, and a power line portion 340B that connects connector 310 and CCID 330 together. Power line portion 340 also includes power lines 341 for transmitting the electric power from system power supply 402.

Plug 320 of charging cable 300 is connected to outlet 400 of system power supply 402 in house 450 when external charging is performed. Connector 310 of charging cable 300 is connected to inlet 270 provided on the body of vehicle 10 when external charging is performed. When plug 320 and outlet 400 are connected together and connector 310 and inlet 270 are connected together, the electric power from system power supply 402 is transmitted to vehicle 10. Plug 320 can be attached to and removed from outlet 400. Connector 310 can be attached to and removed from inlet 270.

Connector 310 includes a connection detection circuit 312 therein. Connection detection circuit 312 detects a connection state between inlet 270 and connector 310. Connection detection circuit 312 transmits connection signal CNCT indicating the connection state through inlet 270 to vehicle-side ECU 170 of vehicle 10.

Connection detection circuit 312 may be configured as a limit switch as shown in FIG. 1, such that the potential of connection signal CNCT becomes a ground potential (0V) when connector 310 is connected to inlet 270. Alternatively, connection detection circuit 312 may be configured as a resistor (not shown) having a prescribed resistance value, such that the potential of connection signal CNCT decreases to a prescribed potential upon connection. In either case, vehicle-side ECU 170 detects that connector 310 has been connected to inlet 270 by detecting the potential of connection signal CNCT.

CCID 330 includes a CCID relay 332 and a control pilot circuit 334. CCID relay 332 is inserted into power lines 341 in charging cable 300. CCID relay 332 is controlled by control pilot circuit 334. When CCID relay 332 is opened, an electrical path of power lines 341 is interrupted. When CCID relay 332 is closed, on the other hand, electric power is supplied from system power supply 402 to vehicle 10.

Control pilot circuit 334 outputs pilot signal CPLT to vehicle-side ECU 170 through connector 310 and inlet 270. This pilot signal CPLT is a signal for notifying vehicle-side ECU 170 of a rated current of charging cable 300 from control pilot circuit 334. Pilot signal CPLT is also used as a signal for remotely controlling CCID relay 332 from vehicle-side ECU 170 based on the potential of pilot signal CPLT which is controlled by vehicle-side ECU 170. Control pilot circuit 334 controls CCID relay 332 based on potential variation in pilot signal CPLT.

The aforementioned pilot signal CPLT and connection signal CNCT, and the configurations such as the shapes and the terminal arrangement of inlet 270 and connector 310 are standardized, for example, by the SAE (Society of Automotive Engineers) of the United States of America and the Japan Electric Vehicle Association.

House 450 includes outlet 400, system power supply 402, second PLC device 404, a house-side ECU 406, wireless communication device 408, an input unit 410, a notification unit 412, a switching unit 414, an electrical load 416, and power lines 441.

In this embodiment, system power supply 402 and house-side ECU 406 in house 450 correspond to a charging apparatus for externally charging power storage device 150 in vehicle 10 in a manner coordinated with vehicle-side ECU 170. This charging apparatus is part of an electric power management system for adjusting an amount of power used by at least one of the plurality of electrical devices connected to system power supply 402 in house 450.

Although system power supply 402 is described as an AC power supply in this embodiment, it may be a DC power supply, for example.

Second PLC device 404 is connected to power lines 441. Second PLC device 404 conducts power line communication with first PLC device 172.

Second PLC device 404 includes a modem, for example. When second PLC device 404 receives a high-frequency signal through power lines 441 from first PLC device 172 of vehicle 10, second PLC device 404 demodulates data from the received high-frequency signal. Second PLC device 404 transmits the demodulated data to house-side ECU 406.

When second PLC device 404 receives data from house-side ECU 406, second PLC device 404 modulates the received data into a high-frequency signal. Second PLC device 404 outputs the modulated high-frequency signal to power lines 441.

House-side ECU 406 includes a CPU (not shown), and a memory 407 having the function of a storage device, an input/output buffer or the like. When communication with vehicle-side ECU 170 becomes possible, house-side ECU 406 receives signals from various sensors and the like provided in vehicle 10 and outputs control commands to various devices mounted on vehicle 10 through vehicle-side ECU 170, and controls the various devices. Such control is not limited to software processing, but may be processed by constructing dedicated hardware (electronic circuitry).

Wireless communication device 408 conducts wireless communication with a wireless communication device outside or inside of house 450. In this embodiment, wireless communication device 408 conducts wireless communication with wireless communication device 174 of vehicle 10.

The communication between vehicle-side ECU 170 and house-side ECU 406 may be conducted when outlet 400 and plug 320 are connected together and connector 310 and inlet 270 are connected together, or when vehicle 10 and house 450 are within an area where they can communicate with each other.

In this embodiment, vehicle-side ECU 170 and house-side ECU 406 perform external charging in a coordinated manner when outlet 400 and plug 320 are connected together and connector 310 and inlet 270 are connected together.

Vehicle-side ECU 170 and house-side ECU 406 may communicate with each other by wireless communication using wireless communication device 174 and wireless communication device 408, when outlet 400 and plug 320 are connected together and connector 310 and inlet 270 are connected together.

Alternatively, vehicle-side ECU 170 and house-side ECU 406 may communicate with each other by power line communication using first PLC device 172 and second PLC device 404, when outlet 400 and plug 320 are connected together and connector 310 and inlet 270 are connected together.

Alternatively, vehicle-side ECU 170 and house-side ECU 406 may communicate with each other by combining the aforementioned wireless communication and power line communication, when outlet 400 and plug 320 are connected together and connector 310 and inlet 270 are connected together.

A communication method is not particularly limited to the aforementioned methods. For example, as indicated by a broken line in FIG. 1, a communication line that passes through and connects inlet 270, connector 310, plug 320 and outlet 400 together may be, provided between vehicle-side ECU 170 and house-side ECU 406. Vehicle-side ECU 170 and house-side ECU 406 may communicate with each other by using this communication line, when outlet 400 and plug 320 are connected together and connector 310 and inlet 270 are connected together.

Input unit 410 is an interface for receiving instructions from the user in house 450. Input unit 410 transmits a signal corresponding to a received instruction to house-side ECU 406.

In this embodiment, input unit 410 receives input of, for example, the reservation information from the user. The reservation information can be input by, for example, direct input of a numerical value corresponding to the time, input to change a time displayed on a display device to a desired time, input to select one of a plurality of times displayed on the display device, input with a remote controller or a mobile terminal, and the like.

Input unit 410 may consist of a button, a dial and the like, may consist of an icon and the like displayed on a touch panel, or may be a reception device that receives data including the reservation information from a remote controller or a mobile terminal, for example.

In this embodiment, house-side ECU 406 determines the reservation information based on the signal from input unit 410, and causes memory 407 to store the determined reservation information.

Notification unit 412 notifies the user in house 450 of prescribed information. In this embodiment, notification unit 412 notifies the user of the prescribed information by using a display device consisting of an LCD, an LED and the like. Notification unit 412 may notify the user of the prescribed information by, for example, using a sound generation device that generates sound or voice.

In response to a control signal S1 from house-side ECU 406, switching unit 414 switches between a first state where electrical load 416 and system power supply 402 are connected to power lines 441 in parallel with each other and a second state where system power supply 402 is disconnected.

In the first state, the electric power from system power supply 402 is supplied to electrical load 416. The electric power from system power supply 402 may also be supplied to vehicle 10 when outlet 400 and plug 320 are connected together and connector 310 and inlet 270 are connected together.

In the second state, on the other hand, vehicle 10 serves as a power supply of electrical load 416. Specifically, house-side ECU 406 controls the power conversion device through vehicle-side ECU 170 such that the DC power in power storage device 150 is converted to AC power, and controls CCID relay 332 such that the converted AC power is supplied to electrical load 416 through power lines 241, 341 and 441.

Electrical load 416 is an electrical device installed in house 450 or on a premise of house 450. The operation of electrical load 416 may be controlled in response to a control signal S2 from house-side ECU 406, for example, such that power consumption and the like of electrical load 416 are adjusted. House-side ECU 406 may control switching unit 414 such that switching from the first state to the second state takes place, for example, during a prescribed period of time that covers partially or completely a time period including the peak of electric power demand of a supplier (e.g., an electric power company) of system power supply 402.

Figure 2:
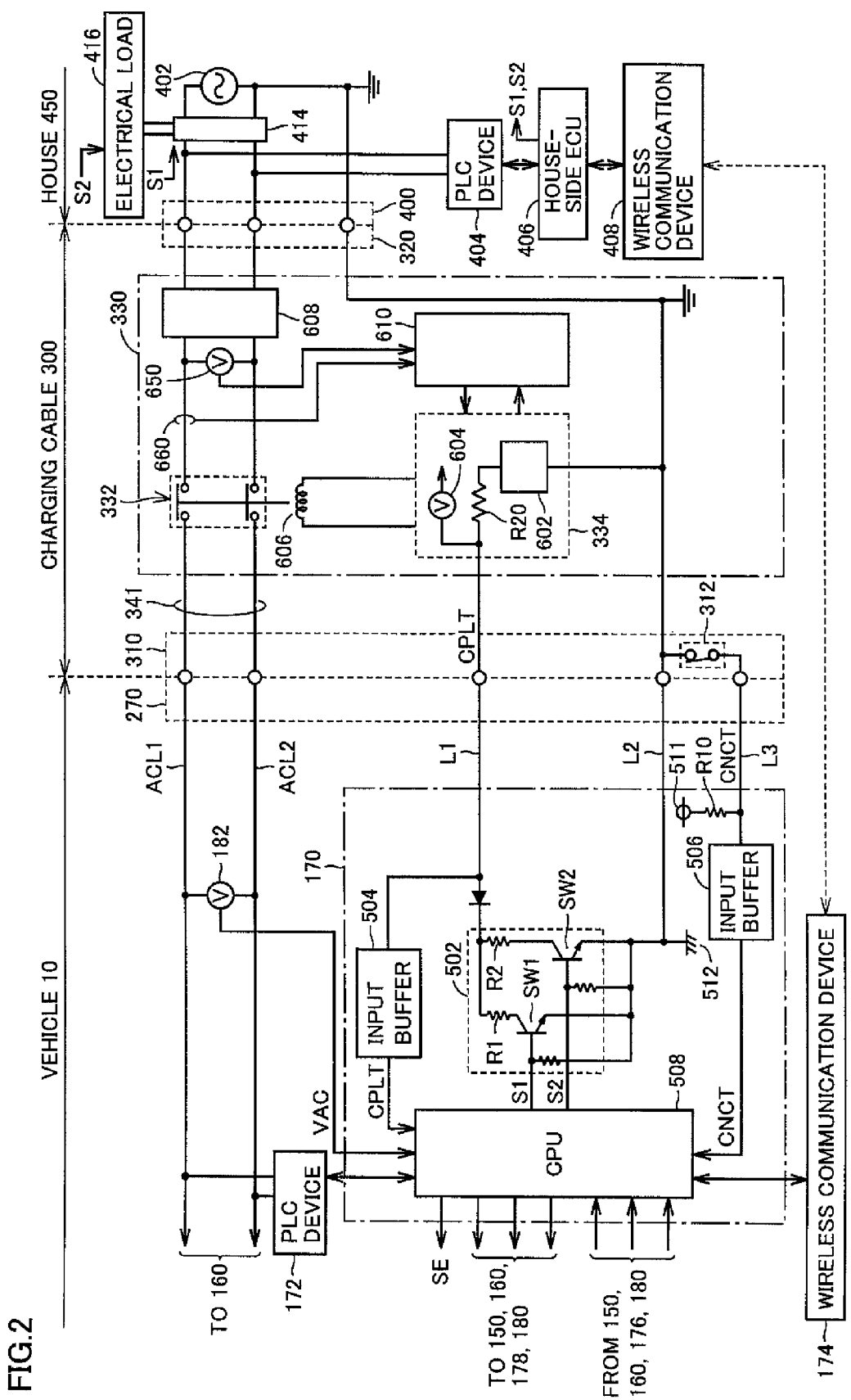
FIG. 2 shows an example of a detailed view of the charging system in FIG. 1.

FIG. 2 illustrates the configuration of charging system 1 shown in FIG. 1 in more detail. The description of the elements in FIG. 2 designated by the same reference characters as in FIG. 1 will not be repeated.

Referring to FIG. 2, CCID 330 includes, in addition to CCID relay 332 and control pilot circuit 334, an electromagnetic coil 606, a leakage detector 608, a CCID control unit 610, a voltage sensor 650 and a current sensor 660. Control pilot circuit 334 includes an oscillation device 602, a resistance R20, and a voltage sensor 604.

Although not shown, CCID control unit 610 includes a CPU, a storage device, and an input/output buffer. CCID control unit 610 inputs and outputs signals to and from the various sensors and control pilot circuit 334, and controls charging operation of charging cable 300.

When the potential of pilot signal CPLT which is detected by voltage sensor 604 is a predetermined potential (e.g., 12V), oscillation device 602 outputs a non-oscillating signal. When the potential of pilot signal CPLT decreases from the above predetermined potential (e.g., 9V), oscillation device 602 is controlled by CCID control unit 610 to output a signal oscillating at a predetermined frequency (e.g., 1 kHz) and duty cycle.

The potential of pilot signal CPLT is controlled by vehicle-side ECU 170, as will be described later in FIG. 3. The duty cycle is set based on the rated current that can be supplied from system power supply 402 to vehicle 10 through charging cable 300.

As described above, when the potential of pilot signal CPLT decreases from the predetermined potential, pilot signal CPLT oscillates in a predetermined cycle. A pulse width of pilot signal CPLT is set based on the rated current that can be supplied from system power supply 402 to vehicle 10 through charging cable 300. That is, by means of a duty represented by a ratio of the pulse width to the oscillation cycle, control pilot circuit 334 notifies vehicle-side ECU 170 of vehicle 10 of the rated current by using pilot signal CPLT.

A rated current is determined for each charging cable, and varies with the type of charging cable 300. Accordingly, the duty of pilot signal CPLT also varies with each charging cable 300.

Based on the duty of pilot signal CPLT received through a control pilot line L1, vehicle-side ECU 170 can detect the rated current that can be supplied to vehicle 10 through charging cable 300.

When the potential of pilot signal CPLT further decreases (e.g., 6V) by vehicle-side ECU 170, control pilot circuit 334 supplies a current to electromagnetic coil 606. In response to the current supply from control pilot circuit 334, electromagnetic coil 606 generates an electromagnetic force, and closes the contacts of CCID relay 332 to render CCID relay 332 conducting.

Leakage detector 608 is provided on power lines 341 of charging cable 300 within CCID 330, and detects the presence or absence of leakage. Specifically, leakage detector 608 detects a balance of currents flowing through a pair of power lines 341 in opposite directions, and detects that leakage has occurred when the balance is disturbed. Although not particularly shown, when leakage is detected by leakage detector 608, power feeding to electromagnetic coil 606 is interrupted, and the contacts of CCID relay 332 are opened to render CCID relay 332 non-conducting.

When plug 320 is inserted into outlet 400, voltage sensor 650 detects a power supply voltage transmitted from system power supply 402, and transmits a detection value to CCID control unit 610. Current sensor 660 detects a charging current flowing through power lines 341, and transmits a detection value to CCID control unit 610.

Connection detection circuit 312 included in connector 310 is a limit switch, for example, as described above, whose contacts are closed when connector 310 is connected to inlet 270 and are opened when connector 310 is disconnected from inlet 270.

When connector 310 is disconnected from inlet 270, a voltage signal determined by a voltage of a power supply node 511 and a pull-up resistor R10 included in vehicle-side ECU 170 is generated as connection signal CNCT on a connection signal line L3. When connector 310 is connected to inlet 270, connection signal line L3 is short-circuited with a ground line L2, causing the potential of connection signal line L3 to be the ground potential (0V).

Connection detection circuit 312 may be a resistor (not shown). In this case, when connector 310 is connected to inlet 270, a voltage signal determined by a voltage of power supply node 511, pull-up resistor R10 and this resistor is generated on connection signal line L3.

Whether connection detection circuit 312 is a limit switch or a resistor as described above, the potential generated on connection signal line L3 (namely, the potential of connection signal CNCT) varies between when connector 310 is connected to and disconnected from inlet 270. Accordingly, vehicle-side ECU 170 can detect a connection state of connector 310 by detecting the potential of connection signal line L3.

In vehicle 10, vehicle-side ECU 170 includes, in addition to power supply node 511 and pull-up resistor R10 described above, a resistance circuit 502, input buffers 504 and 506, and a CPU 508. Input buffers 504 and 506 are included in memory 171 of FIG. 1.

Resistance circuit 502 includes pull-down resistors R1, R2, and switches SW1, SW2. Pull-down resistor R1 and switch SW1 are connected in series between control pilot line L1 through which pilot signal CPLT is communicated and a vehicle ground 512. Pull-down resistor R2 and switch SW2 are also connected in series between control pilot line L1 and vehicle ground 512. Switches SW1 and SW2 are controlled such that they are rendered conducting or non-conducting in accordance with control signals S1 and S2 from CPU 508, respectively.

This resistance circuit 502 is a circuit for controlling the potential of pilot signal CPLT from the vehicle 10 side.

Input buffer 504 receives pilot signal CPLT on control pilot line L1, and outputs received pilot signal CPLT to CPU 508. Input buffer 506 receives connection signal CNCT from connection signal line L3 which is connected to connection detection circuit 312 of connector 310, and outputs received connection signal CNCT to CPU 508. A voltage is applied to connection signal line L3 from vehicle-side ECU 170 as described above, and the potential of connection signal CNCT varies when connector 310 is connected to inlet 270. CPU 508 detects a connection state of connector 310 by detecting the potential of this connection signal CNCT.

CPU 508 receives pilot signal CPLT and connection signal CNCT from input buffers 504 and 506, respectively. CPU 508 detects a connection state of connector 310 by detecting the potential of connection signal CNCT.

CPU 508 detects the rated current of charging cable 300 as described above by detecting an oscillation state and duty cycle of pilot signal CPLT.

CPU 508 controls the potential of pilot signal CPLT by controlling control signals S1 and S2 for switches SW1 and SW2 based on the potential of connection signal CNCT and the oscillation state of pilot signal CPLT. As such, CPU 508 can remotely control relay 332. Then, electric power is transmitted from system power supply 402 to vehicle 10 through charging cable 300.

Referring to FIGS. 1 and 2, when the contacts of CCID relay 332 are closed, AC power from system power supply 402 is supplied to power conversion device 160, to complete preparation for charging of power storage device 150 from system power supply 402. CPU 508 outputs control signal PWE to power conversion device 160, to convert the AC power from system power supply 402 to DC power capable of charging power storage device 150. CPU 508 outputs control signal SE to close the contacts of relay 155, to perform charging of power storage device 150.

Figure 3:
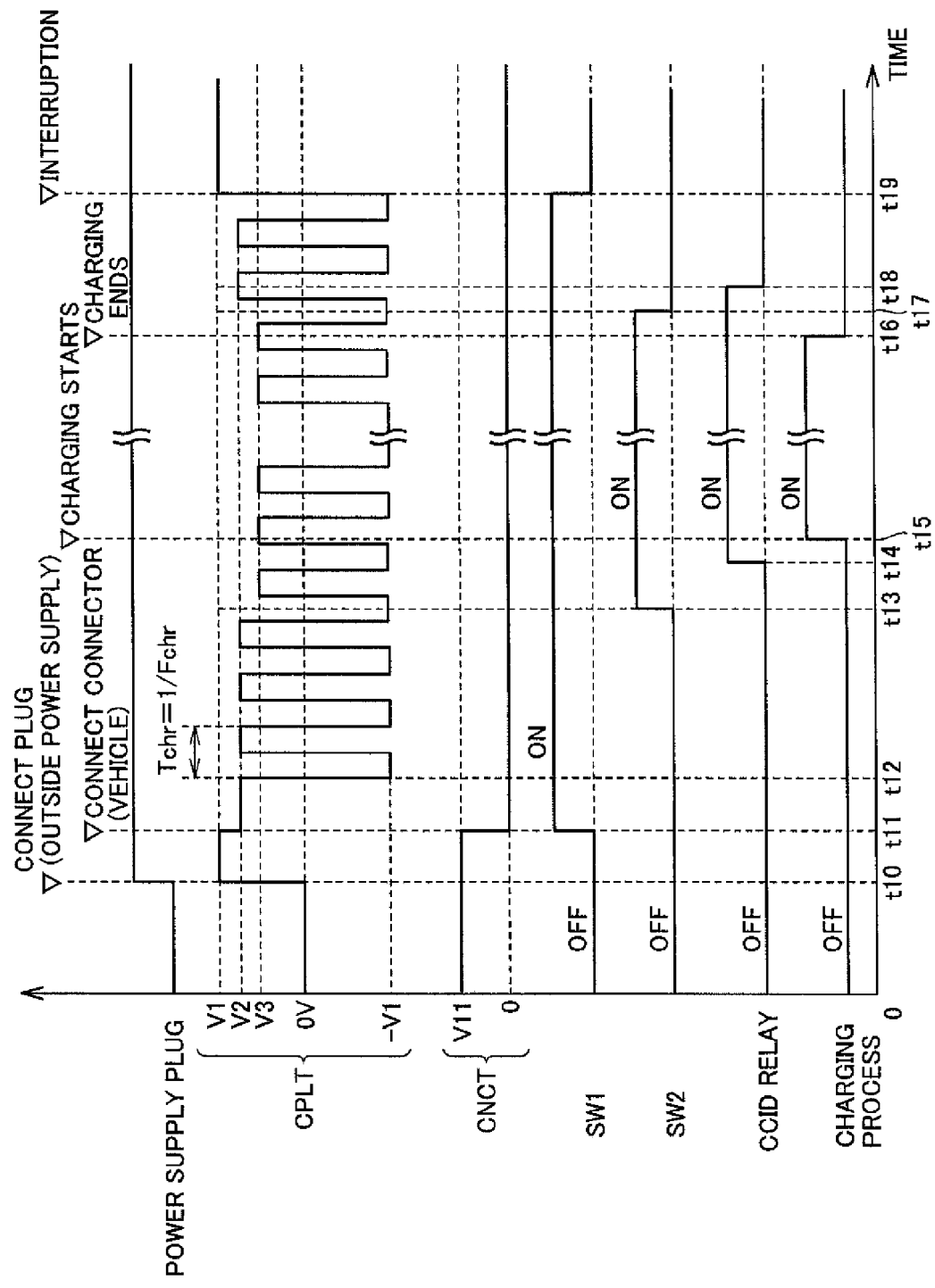
FIG. 3 is a time chart illustrating a sequence of external charging.

FIG. 3 is a time chart illustrating a sequence of external charging by the charging system of FIG. 2. In FIG. 3, a horizontal axis represents time, and a vertical axis represents a connection state of plug 320, a potential of pilot signal CPLT, a potential of connection signal CNCT, states of switches SW1 and SW2, a state of CCID relay 332, and a state of a charging process.

Referring to FIGS. 2 and 3, until time t10, charging cable 300 is not connected to either vehicle 10 or system power supply 402. In this state, switches SW1, SW2 and CCID relay 332 are off, and pilot signal CPLT has a potential of 0V. Connection signal CNCT has a potential of V11 (>0V).

When plug 320 of charging cable 300 is connected to outlet 400 of system power supply 402 at time t10, control pilot circuit 334 receives electric power from system power supply 402 and generates pilot signal CPLT.

At this time t10, connector 310 of charging cable 300 has not yet been connected to inlet 270. Pilot signal CPLT has a potential of V1 (e.g., 12V), and pilot signal CPLT is not oscillating.

When connector 310 is connected to inlet 270 at time t11, connection detection circuit 312 detects that the potential of connection signal CNCT decrease.

When the decrease in potential of connection signal CNCT is detected, CPU 508 detects connection between connector 310 and inlet 270. Accordingly, control signal S1 is activated by CPU 508 to turn switch SW1 on. Then, the potential of pilot signal CPLT decreases to V2 (e.g., 9V) by pull-down resistor R1 of resistance circuit 502.

At time t12, CCID control unit 610 detects that the potential of pilot signal CPLT has decreased to V2. Accordingly, CCID control unit 610 causes pilot signal CPLT to oscillate in an oscillation cycle Tchr (=1/Fchr). It is noted that Fchr represents an oscillation frequency.

When the oscillation of pilot signal CPLT is detected, CPU 508 detects the rated current of charging cable 300 from the duty of pilot signal CPLT as described above.

Then, CPU 508 activates control signal S2 to turn switch SW2 on so as to start charging operation. Accordingly, the potential of pilot signal CPLT decreases to V3 (e.g., 6V) by pull-down resistor R2 (time t13 in FIG. 3).

When this decrease to V3 in potential of pilot signal CPLT is detected by CCID control unit 610, at time t14, the contacts of CCID relay 332 are closed, and the electric power from system power supply 402 is transmitted to vehicle 100 through charging cable 300.

Then, when AC voltage VAC is detected in vehicle 10, CPU 508 closes the contacts of relay 155 (FIG. 1) and controls power conversion device 160 (FIG. 1), to start charging of power storage device 150 (FIG. 1) (time t15 in FIG. 3).

When the charging of power storage device 150 continues and it is detected that power storage device 150 has been fully charged, CPU 508 ends the charging process (time t16 in FIG. 3). Then, CPU 508 deactivates control signal S2 to render switch SW2 non-conducting (time t17 in FIG. 3). Accordingly, the potential of pilot signal CPLT becomes V2, causing the charging process to stop and rendering CCID relay 332 non-conducting (time t18), to complete the charging operation. Then, CPU 508 deactivates control signal S1 to render switch SW1 non-conducting, to interrupt the system.

In vehicle 100 having the configuration as described above, charging is started in accordance with the sequence as shown in FIG. 3 when plug 320 and outlet 400 are connected together and connector 310 and inlet 270 are connected together, and if a reservation for external charging has not been made. That a reservation for external charging has not been made means that the reservation information is not stored in either memory 171 of vehicle-side ECU 170 or memory 407 of house-side ECU 406.

If a reservation for external charging has been made, on the other hand, charging is not immediately started but started based on a reserved time (start time or end time) even when plug 320 and outlet 400 are connected together and connector 310 and inlet 270 are connected together. That a reservation for external charging has been made means that the reservation information is stored in at least one of memory 171 of vehicle-side ECU 170 and memory 407 of house-side ECU 406.

Vehicle-side ECU 170 generates, in addition to the reservation information determined by the user's input as described above (hereinafter referred to as "reservation information of user input"), reservation information at a request based on a state of vehicle 10 which is different from a request by the user (hereinafter referred to as "reservation information of vehicle request"), and causes memory 171 to store this information.

Specifically, vehicle-side ECU 170 makes a reservation for external charging of power storage device 150, for example, so as to warm up power storage device 150 by utilizing Joule heat generated by internal resistance in power storage device 150. When power storage device 150 has a temperature lower than a threshold value, vehicle-side ECU 170 generates the reservation information for charging for the purpose of warming up power storage device 150. Vehicle-side ECU 170 may generate the reservation information such that external charging for the warm-up purposes is performed immediately before the start of use of vehicle 10 (e.g., a prescribed period of time in the early morning), for example.

Alternatively, vehicle-side ECU 170 makes a reservation for external charging of power storage device 150 so as to make a diagnosis of abnormality or degradation of power storage device 150 by charging and discharging of power storage device 150. Vehicle-side ECU 170 makes a diagnosis of abnormality or degradation of power storage device 150 based on a voltage, a usage history of power storage device 150 or a state of vehicle 10 including a travel history of vehicle 10.

Vehicle-side ECU 170 may make a diagnosis of abnormality or degradation of power storage device 150, for example, when the voltage of power storage device 150 falls below a threshold value, whenever a period of use of vehicle 10 becomes equal to or longer than a threshold value, or whenever a travel distance (travel period) becomes equal to or longer than a threshold value.

Vehicle-side ECU 170 makes a diagnosis of abnormality or degradation based on, for example, a state (current, voltage, SOC or the like) of power storage device 150 before and after reducing the SOC of power storage device 150 by a prescribed amount. Vehicle-side ECU 170 makes a diagnosis of abnormality or degradation based on, for example, a full charging capacity or variation between a previous value and a current value of the full charging capacity. Vehicle-side ECU 170 makes a reservation for external charging, for example, so as to recover the SOC of power storage device 150 that has decreased after the diagnosis of abnormality or degradation to a level before the diagnosis. For example, vehicle-side ECU 170 makes a diagnosis of abnormality or degradation during a period when vehicle 10 is not used (e.g., between midnight and early morning), and generates the reservation information such that external charging is performed after the diagnosis.

Alternatively, vehicle-side ECU 170 makes a reservation for external charging of power storage device 150 so as to perform a refreshing process of power storage device 150. Vehicle-side ECU 170 performs the refreshing process by discharging power storage device 150 to reduce the SOC by a prescribed amount then charging power storage device 150. Power storage device 150 is discharged by using a resistor for discharge, motor generator 120 or the like. Vehicle-side ECU 170 generates the reservation information, for example, such that power storage device 150 is discharged during a period when vehicle 10 is not used and external charging is performed after the discharge.

Memory 407 in house-side ECU 406 stores a reservation table such as shown in FIG. 4, for example. The reservation table shown in FIG. 4 is an example and the reservation information is not limited to the configuration shown in FIG. 4. It is only required that at least one of a start time and an end time of external charging and an attribute be associated with each other and stored in memory 407.

As shown in FIG. 4, in memory 407 of house-side ECU 406, a start time, an end time and an attribute are associated with each other and stored for a reservation number 1 in the reservation table.

Memory 171 in vehicle-side ECU 170 stores a reservation table such as shown in FIG. 5. The reservation table shown in FIG. 5 is an example and the reservation information is not limited to the configuration shown in FIG. 5. In memory 171, a start time, an end time and an attribute are associated with each other and stored for a reservation number A in the reservation table.

When there are a plurality of reservations for external charging, the plurality of reservations are associated with different reservation numbers, respectively. At least one of the start time and end time may be determined, or one of them may be determined and the other may then be determined based on a period of time required for the charging.

The reservation tables in FIGS. 4 and 5 may include a date in addition to the start time, end time and attribute.

The attributes written in the reservation tables in FIGS. 4 and 5 indicate whether the reservation information was determined by the user's input in vehicle-side ECU 170 before communication with house-side ECU 406 became possible, or the reservation information was determined by the user's input in vehicle-side ECU 170 after communication with house-side ECU 406 became possible, or the reservation information was determined at a request based on a state of vehicle 10, or the reservation information was determined by the user's input in house-side ECU 406.

If the reservation information was determined by the user's input in vehicle-side ECU 170 before communication with house-side ECU 406 became possible, the attribute is "1".

If the reservation information was determined by the user's input in vehicle-side ECU 170 after communication with house-side ECU 406 became possible, the attribute is "2".

If the reservation information was determined at a request based on a state of vehicle 10, the attribute is "3".

If the reservation information was determined by the user's input in house-side ECU 406, the attribute is "4".

That is, vehicle-side ECU 170 or house-side ECU 406 can determine a situation in which the reservation information was determined based on the attribute added to the reservation information. For example, vehicle-side ECU 170 or house-side ECU 406 can determine based on the attribute whether the reservation information was determined by the user's input or determined at a request based on a state of vehicle 10.

House-side ECU 406 controls vehicle 10 through vehicle-side ECU 170 such that power storage device 150 is externally charged in accordance with the reservation information stored in one of memory 171 of vehicle-side ECU 170 and memory 407 of house-side ECU 406.

When a current time is before a start time included in the reservation information (or a start time calculated from an end time), for example, house-side ECU 406 waits without turning switch SW2 on. When the current time becomes the start time, house-side ECU 406 closes CCID relay 332 and activates power conversion device 160, to start external charging of power storage device 150.

However, since the user can make a charging reservation on both the house 450 side and the vehicle 10 side, if the reservation information is stored in both memory 171 of vehicle-side ECU 170 and memory 407 of house-side ECU 406, it is challenging to determine how to handle them.

In this embodiment, therefore, if a reservation for charging of power storage device 150 by system power supply 402 has been made in both vehicle-side ECU 170 and house-side ECU 406, external charging is performed by giving the reservation in house-side ECU 406 a higher priority than the reservation in vehicle-side ECU 170.

Moreover, when a charging reservation has been made in both vehicle-side ECU 170 and house-side ECU 406, if the reservation in vehicle-side ECU 170 was made at a request based on a state of vehicle 10 which is different from a request by the user, external charging is performed by giving the reservation in vehicle-side ECU 170 a higher priority than the reservation in house-side ECU 406.

Furthermore, when a charging reservation has been made in both vehicle-side ECU 170 and house-side ECU 406, if the reservation in vehicle-side ECU 170 was made before communication between vehicle-side ECU 170 and house-side ECU 406 became possible, external charging is performed by giving the reservation in vehicle-side ECU 170 a higher priority than the reservation in house-side ECU 406.

Figure 6:
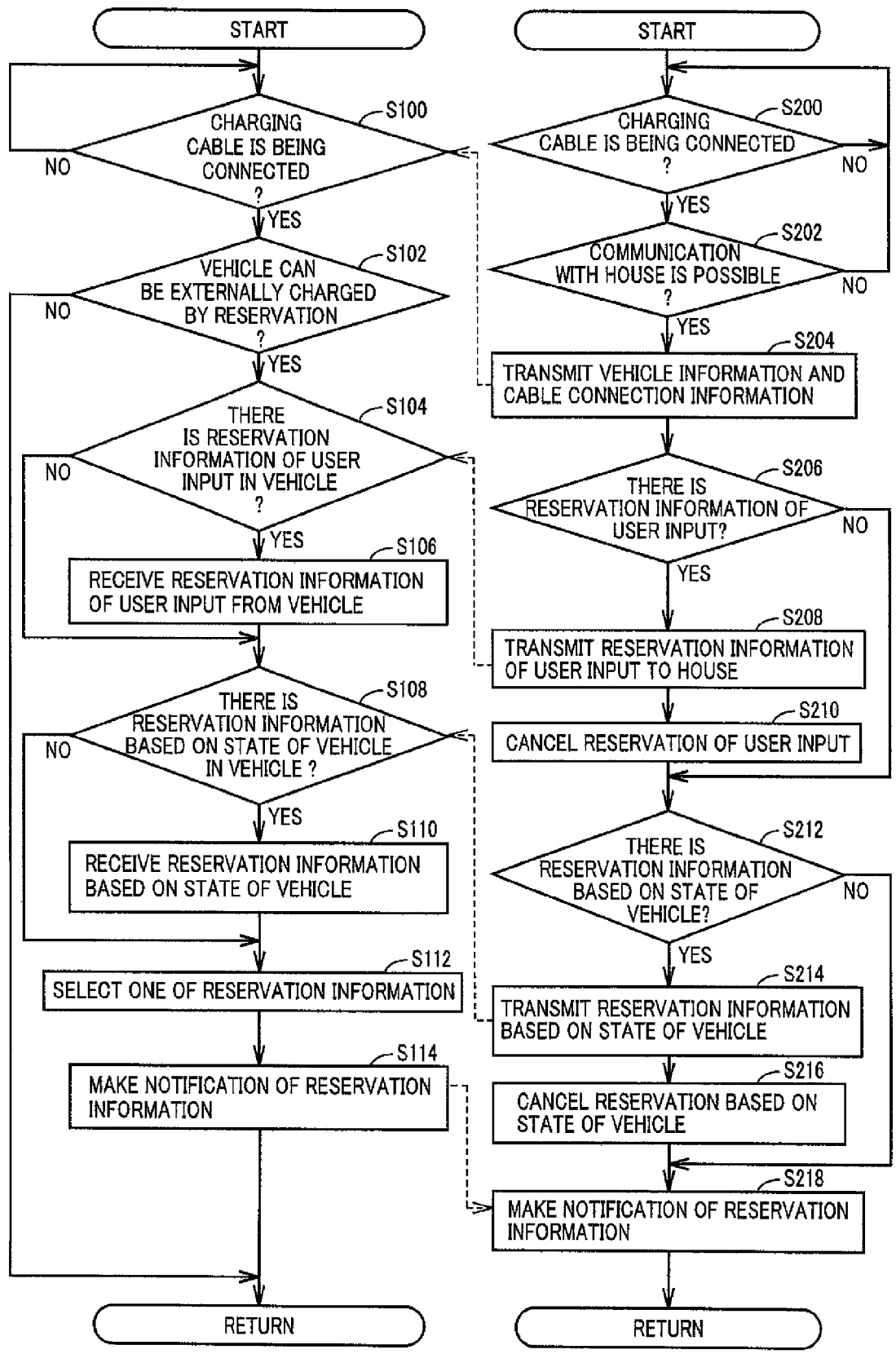
FIG. 6 is a flow chart illustrating a control structure of a program executed in each of the house-side ECU and the vehicle-side ECU.

Referring now to FIG. 6, a control structure of a program executed in house-side ECU 406 will be described.

In step (the step is hereinafter referred to as S) 100, house-side ECU 406 determines whether or not charging cable 300 is being connected to each of vehicle 10 and house 450. Specifically, house-side ECU 406 determines that charging cable 300 is being connected when plug 320 and outlet 400 are connected together and connector 310 and inlet 270 are connected together.

House-side ECU 406 determines whether or not charging cable 300 is being connected based on cable connection information which is received through the aforementioned wireless communication, power line communication or other wired communications from vehicle-side ECU 170.

If the charging cable is being connected (YES in S100), the process proceeds to S102. If not (NO in S100), the process returns to S100.

In S102, house-side ECU 406 determines whether or not vehicle 10 is a vehicle that can be externally charged by a reservation. House-side ECU 406 determines whether or not vehicle 10 is a vehicle that can be externally charged by a reservation based on vehicle information which is received through the aforementioned wireless communication, power line communication or other wired communications from vehicle-side ECU 170.

If vehicle 10 is a vehicle that can be externally charged by a reservation (YES in S102), the process proceeds to S104. If not (NO in S102), the process ends.

In S104, house-side ECU 406 determines whether or not there is the reservation information of user input in vehicle 10. If there is the reservation information of user input in vehicle 10 (YES in S104), the process proceeds to S106. If not (NO in S104), the process proceeds to S108.

House-side ECU 406 may determine whether or not there is the reservation information of user input in vehicle 10 based on, for example, the contents of a header of data received from vehicle-side ECU 170, or based on a signal indicating the presence or absence of the reservation information of user input which is received from vehicle-side ECU 170.

In S106, house-side ECU 406 receives the reservation information of user input from vehicle-side ECU 170.

In S108, house-side ECU 406 determines whether or not there is the reservation information of vehicle request in vehicle 10. If there is the reservation information of vehicle request in vehicle 10 (YES in S108), the process proceeds to S110. If not (NO in S108), the process proceeds to S112.

House-side ECU 406 may determine whether or not there is the reservation information of vehicle request in vehicle 10 based on, for example, the contents of a header of data received from vehicle-side ECU 170, or based on a signal indicating the presence or absence of the reservation information of vehicle request which is received from vehicle-side ECU 170.

In S110, house-side ECU 406 receives the reservation information of vehicle request from vehicle-side ECU 170. In S112, house-side ECU 406 selects one of the reservation information received from vehicle-side ECU 170 (hereinafter referred to as reservation information on the vehicle 10 side) and the reservation information stored in memory 407 (hereinafter referred to as reservation information on the house 450 side).

If the reservation information on the vehicle 10 side was determined by the user's input in vehicle-side ECU 170 after communication with vehicle-side ECU 170 became possible, house-side ECU 406 gives the reservation information on the house 450 side a higher priority than the reservation information on the vehicle 10 side. In other words, house-side ECU 406 maintains the reservation information on the house 450 side without selecting the reservation information on the vehicle 10 side.

If the reservation information on the vehicle 10 side was determined by the user's input in vehicle-side ECU 170 before communication with vehicle-side ECU 170 became possible, house-side ECU 406 gives the reservation information on the vehicle 10 side a higher priority than the reservation information on the house 450 side. In other words, house-side ECU 406 deletes the reservation information on the house 450 side and causes memory 407 to store the reservation information on the vehicle 10 side.

If the reservation information on the vehicle 10 side was determined at a request based on a state of vehicle 10, house-side ECU 406 gives the reservation information on the vehicle 10 side a higher priority than the reservation information on the house 450 side. In other words, house-side ECU 406 deletes the reservation information on the house 450 side and causes memory 407 to store the reservation information on the vehicle 10 side.

Furthermore, if there is the reservation information on the house 450 side and there is not the reservation information on the vehicle 10 side, house-side ECU 406 maintains the reservation information on the house 450 side. If there is the reservation information on the vehicle 10 side and there is not the reservation information on the house 450 side, house-side ECU 406 causes memory 407 to store the reservation information on the vehicle 10 side.

In S114, house-side ECU 406 notifies the user through notification unit 412 of which one of the reservation information on the house 450 side and the reservation information on the vehicle 10 side has been selected. House-side ECU 406 also transmits the result of selection of the reservation information to vehicle-side ECU 170.

Referring to FIG. 6, a control structure of a program executed in vehicle-side ECU 170 mounted on vehicle 10 will now be described.

In S200, vehicle-side ECU 170 determines whether or not charging cable 300 is being connected to each of vehicle 10 and house 450. A method of determining whether or not charging cable 300 is being connected to each of vehicle 10 and house 450 is as described with reference to FIG. 3, and thus the detailed description thereof will not be repeated. If charging cable 300 is being connected (YES in S200), the process proceeds to S202. If not (NO in S200), the process returns to S200.

In S202, vehicle-side ECU 170 determines whether or not communication with house-side ECU 406 is possible. Vehicle-side ECU 170 may determine that communication with house-side ECU 406 is possible, for example, after transmitting a prescribed signal for starting the communication to the outside and receiving a prescribed signal from house-side ECU 406.

If communication with house-side ECU 406 is possible (YES in S202), the process proceeds to S204. If not (NO in S202), the process returns to S200.

In S204, vehicle-side ECU 170 transmits to house-side ECU 406 a signal indicating the vehicle information that vehicle 10 is a vehicle that can be externally charged by a reservation (e.g., information specifying a mode and the like of vehicle 10) and the cable connection information that charging cable 300 is being connected. Vehicle-side ECU 170 may transmit to house-side ECU 406 a signal indicating the presence or absence of the reservation information of user input or the reservation information of vehicle request in vehicle 10.

In S206, vehicle-side ECU 170 determines whether or not the reservation information of user input is stored in memory 171. If the reservation information of user input is stored in memory 171 (YES in S206), the process proceeds to S208. If not (NO in S206), the process proceeds to S212.

In S208, vehicle-side ECU 170 transmits the reservation information of user input to house-side ECU 406. In S210, vehicle-side ECU 170 cancels the reservation information of user input. That is, vehicle-side ECU 170 deletes the reservation information of user input in memory 171.

In S212, vehicle-side ECU 170 determines whether or not the reservation information of vehicle request is stored in memory 171. If the reservation information of vehicle request is stored in memory 171 (YES in S212), the process proceeds to S214. If not (NO in S212), the process proceeds to S218.

In S214, vehicle-side ECU 170 transmits the reservation information of vehicle request to house-side ECU 406. In S216, vehicle-side ECU 170 cancels the reservation information of vehicle request. That is, vehicle-side ECU 170 deletes the reservation information of vehicle request in memory 171. Vehicle-side ECU 170 identifies the reservation information of user input or the reservation information of vehicle request in memory 171 based on the attribute described above.

In S218, in response to the result of selection of the reservation information from house-side ECU 406, vehicle-side ECU 170 notifies the user through notification unit 178 of which one of the reservation information on the house 450 side and the reservation information on the vehicle 10 side has been selected.

Figure 7:
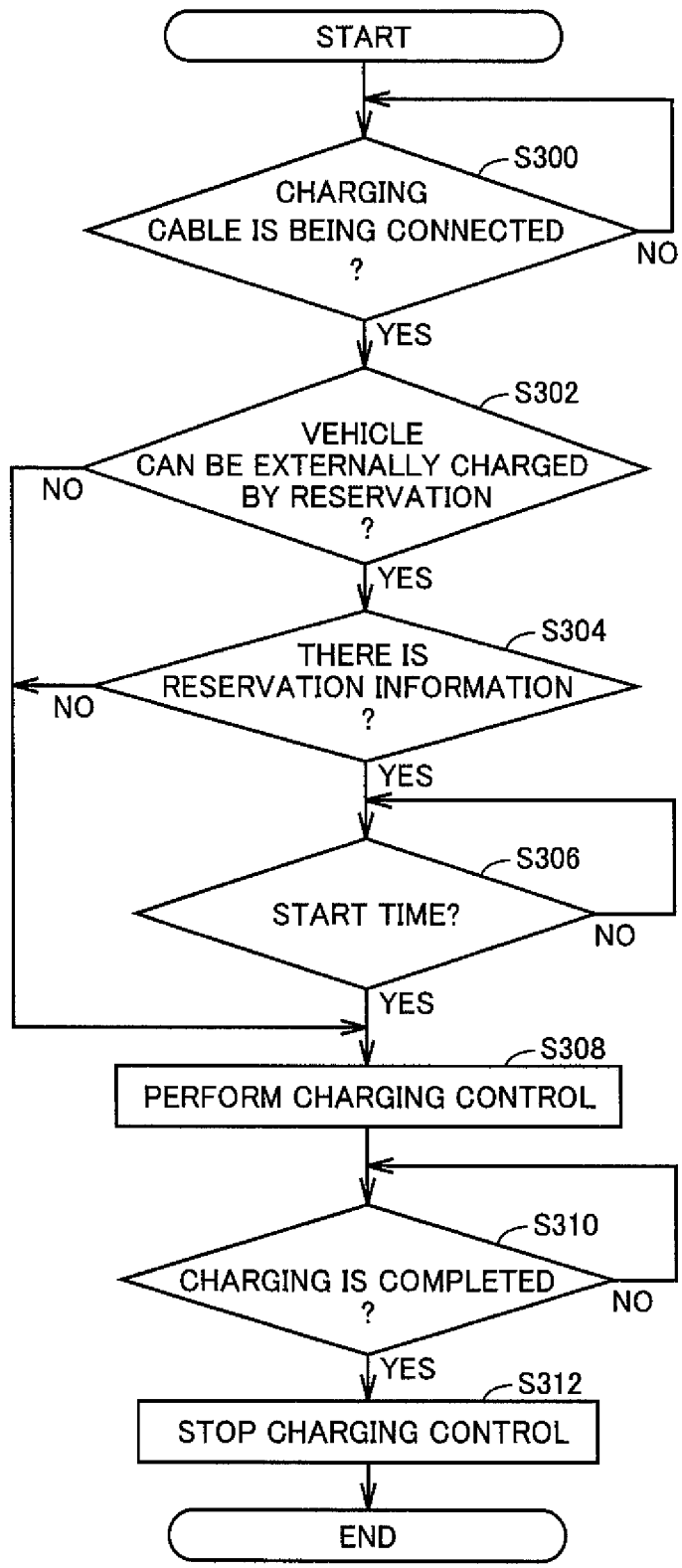
FIG. 7 is a flow chart illustrating a control structure of a program executed in the house-side ECU.

Referring now to FIG. 7, a control structure of a program of reservation charging process executed in house-side ECU 406 will be described.

In S300, house-side ECU 406 determines whether or not charging cable 300 is being connected to each of vehicle 10 and house 450. A determination method is as described in S100 above, and thus the detailed description thereof will not be repeated.

If charging cable 300 is being connected (YES in S300), the process proceeds to S302. If not (NO in S300), the process returns to S300.

In S302, house-side ECU 406 determines whether or not vehicle 10 is a vehicle that can be externally charged by a reservation. If vehicle 10 is a vehicle that can be externally charged by a reservation (YES in S302), the process proceeds to S304. If not (NO in S302), the process proceeds to S308.

In S304, house-side ECU 406 determines whether or not the reservation information is stored in memory 407. If the reservation information is stored in memory 407 (YES in S304), the process proceeds to S306. If not (NO in S304), the process proceeds to S308.

In S306, house-side ECU 406 determines whether or not a current time is a start time included in the reservation information. If the current time is the start time (YES in S306), the process proceeds to S308. If not (NO in S306), the process returns to S306.

In S308, house-side ECU 406 performs charging control. Specifically, house-side ECU 406 closes CCID relay 332 and activates power conversion device 160 through vehicle-side ECU 170, to perform external charging of power storage device 150.

In S310, house-side ECU 406 determines whether or not the charging has been completed. House-side ECU 406 may determine that the charging has been completed when the current time is an end time, for example. Alternatively, house-side ECU 406 may determine that the charging has been completed when the SOC of power storage device 150 becomes equal to or higher than a threshold value corresponding to a fully charged state. If the charging has been completed (YES in S310), the process proceeds to S312. If not (NO in S310), the process returns to S310.

In S312, house-side ECU 406 stops the charging control. Specifically, house-side ECU 406 stops the operation of power conversion device 160 and renders CCID relay 332 non-conducting through vehicle-side ECU 170.

Operation of each of vehicle-side ECU 170 and house-side ECU 406 in this embodiment based on the structure and flow chart as described above will be described.

<When the Reservation on the House 450 Side is Given a Higher Priority>

It is assumed, for example, that charging cable 300 is being connected (YES in S100 and YES in S200). If vehicle 10 is a vehicle that can be externally charged by a reservation (YES in S102) and if communication between vehicle-side ECU 170 and house-side ECU 406 is possible (YES in S202), the prescribed information is transmitted from vehicle-side ECU 170 to house-side ECU 406 (S204).

Figure 8:
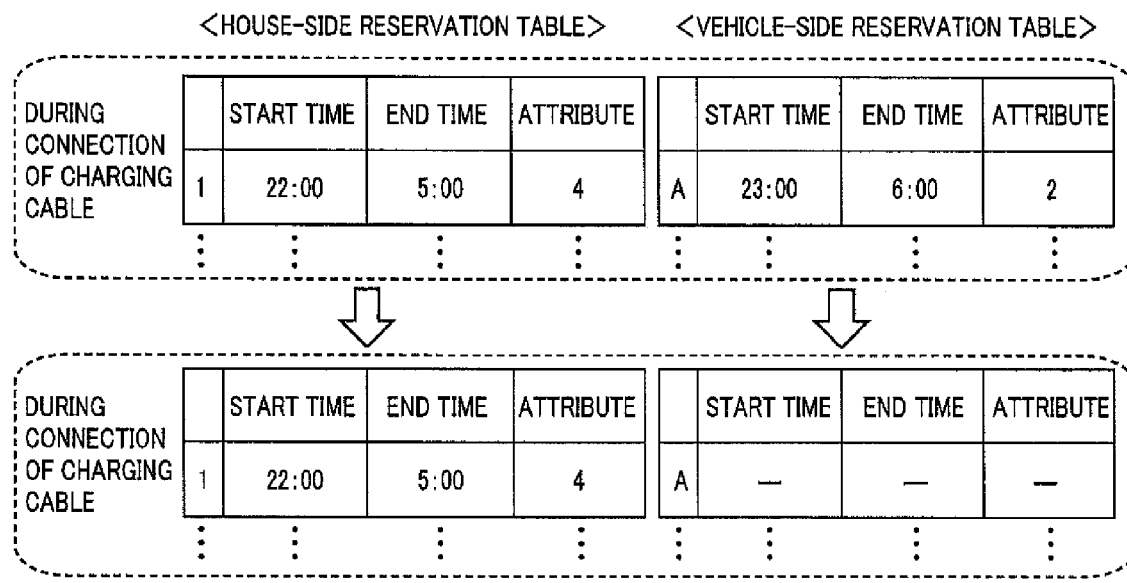
FIG. 8 is a diagram (No. 1) illustrating a process of adjusting the reservation information stored in the memory of the house-side ECU and the reservation information stored in the memory of the vehicle-side ECU.

It is assumed, for example, that the reservation information on the house 450 side such as shown in FIG. 8 has been determined. The reservation information on the house 450 side shown in FIG. 8 includes a start time 22:00, an end time 5:00, and an attribute "4".

In this case, if reservation information including a start time 23:00, an end time 6:00, and an attribute "2" is determined by the user's input on the vehicle 10 side, the determined reservation information is stored in memory 171.

Since the reservation information of user input is stored in memory 171 (YES in S206), vehicle-side ECU 170 transmits the reservation information of user input stored in memory 171 to house-side ECU 406 (S208), then cancels the reservation information of user input stored in memory 171 (S210).

On the other hand, since there is the reservation information of user input in vehicle 10 (YES in S104), house-side ECU 406 receives the reservation information on the vehicle 10 side from vehicle-side ECU 170 (S106).

Since there is not the reservation information of vehicle request in vehicle 10 (NO in S108), house-side ECU 406 selects one of the reservation information on the vehicle 10 side and the reservation information on the house 450 side (S112).

Since the reservation information on the vehicle 10 side was determined after communication with vehicle-side ECU 170 became possible, house-side ECU 406 maintains the reservation information on the house 450 in memory 407 without selecting the reservation information on the vehicle 10 side. House-side ECU 406 notifies the user through notification unit 178 and notification unit 412 that the reservation information on the house 450 side has been selected (S114 and S218).

<When the Reservation on the Vehicle 10 Side is Given a Higher Priority (No. 1)>

It is assumed, for example, that charging cable 300 is being connected (YES in S100 and YES in S200). If vehicle 10 is a vehicle that can be externally charged by a reservation (YES in S102) and if communication between vehicle-side ECU 170 and house-side ECU 406 is possible (YES in S202), the prescribed information is transmitted from vehicle-side ECU 170 to house-side ECU 406 (S204).

Figure 9:
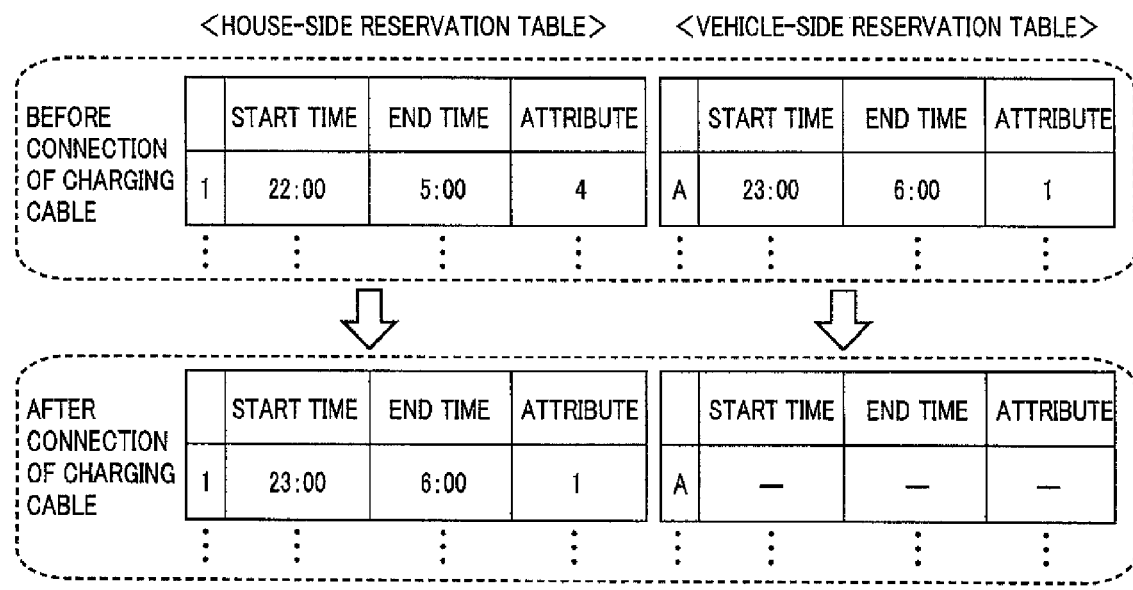
FIG. 9 is a diagram (No. 2) illustrating a process of adjusting the reservation information stored in the memory of the house-side ECU and the reservation information stored in the memory of the vehicle-side ECU.

It is assumed, for example, that the reservation information on the house 450 side such as shown in FIG. 9 has been determined. The reservation information on the house 450 side shown in FIG. 9 includes a start time 22:00, an end time 5:00, and an attribute "4".

In addition, before charging cable 300 is connected, reservation information including a start time 23:00, an end time 6:00, and an attribute "1" is determined by the user's input on the vehicle 10 side, and the determined reservation information is stored in memory 171.

Since the reservation information of user input is stored in memory 171 (YES in S206), vehicle-side ECU 170 transmits the reservation information of user input stored in memory 171 to house-side ECU 406 (S208), then cancels the reservation information of user input stored in memory 171.

On the other hand, since there is the reservation information of user input in vehicle 10 (YES in S104), house-side ECU 406 receives the reservation information of user input from vehicle-side ECU 170 (S106).

Since there is not the reservation information of vehicle request in vehicle 10 (NO in S108), house-side ECU 406 selects one of the reservation information on the vehicle 10 side and the reservation information on the house 450 side (S112).

Since the reservation information on the vehicle 10 side was determined before communication with vehicle-side ECU 170 became possible, house-side ECU 406 deletes the reservation information on the house 450 side, and causes memory 407 to store the reservation information on the vehicle 10 side. House-side ECU 406 notifies the user through notification unit 178 and notification unit 412 that the reservation information on the vehicle 10 side has been selected (S114 and S218).

<When the Reservation on the Vehicle 10 Side is Given a Higher Priority (No. 2)>

It is assumed, for example, that charging cable 300 is being connected (YES in S100 and YES in S200). If vehicle 10 is a vehicle that can be externally charged by a reservation (YES in S102) and if communication between vehicle-side ECU 170 and house-side ECU 406 is possible (YES in S202), the prescribed information is transmitted from vehicle-side ECU 170 to house-side ECU 406 (S204).

Figure 10:
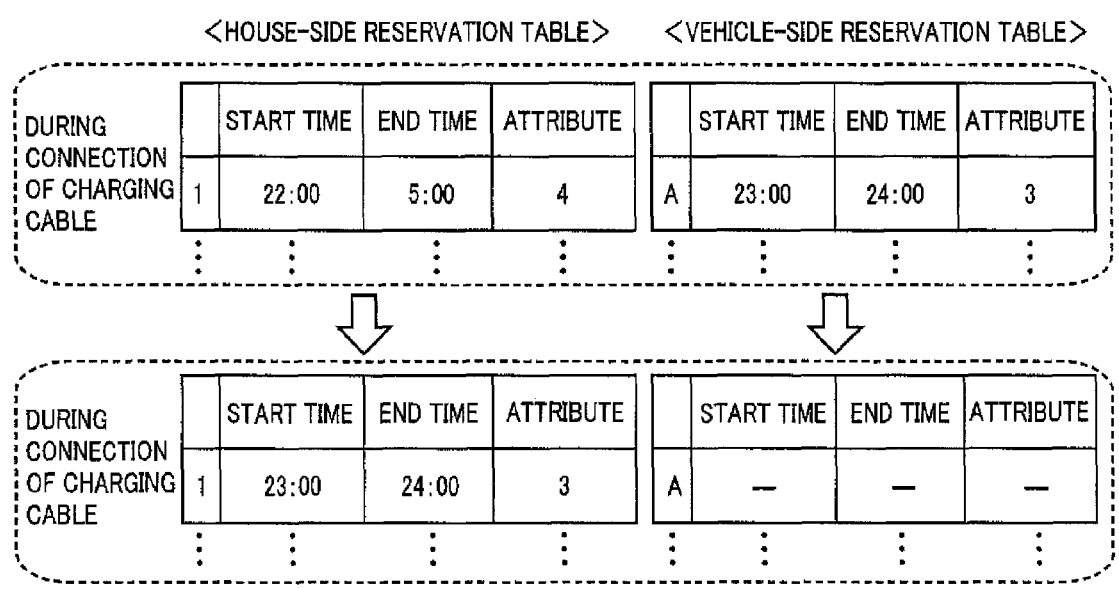
FIG. 10 is a diagram (No. 3) illustrating a process of adjusting the reservation information stored in the memory of the house-side ECU and the reservation information stored in the memory of the vehicle-side ECU.

It is assumed, for example, that the reservation information on the house 450 side such as shown in FIG. 10 has been determined. The reservation information on the house 450 side shown in FIG. 10 includes a start time 22:00, an end time 5:00, and an attribute "4".

In this case, if reservation information including a start time 23:00, an end time 24:00, and an attribute "3" is determined at a request based on a state of vehicle 10 on the vehicle 10 side, the determined reservation information is stored in memory 171.

Since the reservation information of user input is not stored in memory 171 (NO in S206) and the reservation information of vehicle request is stored in memory 171 (YES in S212), vehicle-side ECU 170 transmits the reservation information of vehicle request stored in memory 171 to house-side ECU 406 (S214), then cancels the reservation information of vehicle request stored in memory 171 (S216).

On the other hand, since there is not the reservation information of user input in vehicle 10 (NO in S104) and there is the reservation information of vehicle request in vehicle 10 (YES in S108), house-side ECU 406 receives the reservation information on the vehicle 10 side from vehicle-side ECU 170 (S110). House-side ECU 406 selects one of the reservation information on the vehicle 10 side and the reservation information on the house 450 side (S112).

Since the reservation information on the vehicle 10 side was determined at the request based on a state of vehicle 10, house-side ECU 406 deletes the reservation information on the house 450, and causes memory 407 to store the reservation information on the vehicle 10 side. House-side ECU 406 notifies the user through notification unit 178 and notification unit 412 that the reservation information on the vehicle 10 side has been selected (S114 and S218).

As described above, according to the charging system in this embodiment, if a reservation for external charging of power storage device 150 by system power supply 402 has been made in both vehicle-side ECU 170 and house-side ECU 406, power storage device 150 is externally charged by giving the reservation in house-side ECU 406 a higher priority than the reservation in vehicle-side ECU 170. By giving the reservation information on the house 450 side a higher priority, electric power management by the electric power management system on the house 450 side can be appropriately performed. Therefore, a charging system and a charging method for appropriately adjusting charging reservations when the reservation is made in both the vehicle and the charging apparatus can be provided.

Moreover, if a charging reservation has been made at a request based on a state of vehicle 10, external charging is performed by giving the reservation on the vehicle 10 side a higher priority than the reservation on the house 450 side, so that warm-up, diagnosis of abnormality and degradation, or a refreshing process can be performed on power storage device 150 at an appropriate time. As a result, power storage device 150 can be maintained in an appropriate state, and abnormality or degradation can be diagnosed at an appropriate time.

Furthermore, if a reservation has been made by the user's request in vehicle 10 before communication between vehicle-side ECU 170 and house-side ECU 406 becomes possible, external charging is performed by giving the reservation on the vehicle 10 side a higher priority than the reservation on the house 450 side, so that the user's request can be satisfied.

When the reservation on the vehicle 10 side is given a higher priority, it is desirable that charging and discharging of power storage device 150 be allowed within a range where external charging by the reservation on the vehicle 10 side can be completed. That "external charging by the reservation on the vehicle 10 side can be completed" means that an SOC intended at the time of making a reservation is attained at least at the end time. For example, charging and discharging of power storage device 150 may be allowed on condition that the SOC of power storage device 150 is recovered to a level at the time of making a reservation before the start time of reserved external charging.

Alternatively, power storage device 150 may be charged to an amount higher than an amount of charge intended at the time of making a reservation, to use the excess before the end time. Alternatively, the charging power may be larger than the charging power intended at the time of making a reservation to delay the start time, to allow charging and discharging of power storage device 150 before the delayed start time.

The "charging and discharging of power storage device 150" refers to a case where vehicle 10 is used as a power supply of electrical load 416 in house 450, a case where an electrical device different from the electrical devices mounted on vehicle 10 is connected and used, or a case where power storage device 150 is charged and discharged when the electrical devices mounted on vehicle 10 are used.

Thus, if external charging of vehicle request is planned, house-side ECU 406 can selectively use system power supply 402 and power storage device 150 of vehicle 10 as a power supply of electrical load 416 in house 450. As a result, appropriate electric power management can be realized including avoidance of the use of system power supply 402 during a time period including the peak of electric power demand.

Furthermore, since the user is notified through notification unit 178 and notification unit 412 of which one of the reservation on the vehicle 10 side and the reservation on the house 450 has been selected, the user's recognition can be matched with the actual situation of reservation.

Although house-side ECU 406 receives the reservation information from vehicle-side ECU 170 if there is a reservation of use input in vehicle 10 or if there is a reservation at a request based on a state of vehicle 10 in this embodiment, this is not particularly restrictive. For example, house-side ECU 406 may receive the information about the reservation table shown in FIG. 5 from vehicle-side ECU 170, to determine whether or not there is a reservation by the user's input in the received reservation table, or whether no not there is a reservation at a request based on a state of vehicle 10.

Although this embodiment has been described as selecting either one of the reservation information in house-side ECU 406 and vehicle-side ECU 170 if there is the reservation information in both, this is not particularly restrictive. For example, if there is the reservation information in both house-side ECU 406 and vehicle-side ECU 170, house-side ECU 406 may select either one of the reservation information when the dates or time periods of both reservation information coincide with each other. If the dates or time periods of both reservation information do not coincide with each other, house-side ECU 406 may cause both reservation information to be present.

On the vehicle 10 side, it is desirable that a reservation by the user's input and a reservation at a request based on a state of vehicle 10 be determined such that their time periods do not coincide with each other. For example, vehicle-side ECU 170 may give the reservation by the user's input a higher priority than the reservation at a request based on a state of vehicle 10. Alternatively, vehicle-side ECU 170 may give the reservation at a request based on a state of vehicle 10 a higher priority than the reservation by the user's input.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1 charging system; 10 vehicle; 20 driving unit; 120 motor generator; 130 drive wheel; 140 engine; 145 power split device; 150 power storage device; 155 relay; 160 power conversion device; 170 vehicle-side ECU; 171, 407 memory; 172, 404 PLC device; 174, 408 wireless communication device; 176, 410 input unit; 178, 412 notification unit; 180 motor driving device; 182, 604, 650 voltage sensor; 241, 341, 441, ACL1, ACL2 power line; 270 inlet; 300 charging cable; 310 connector; 312 connection detection circuit; 320 plug; 332 CCID relay; 334 control pilot circuit; 400 outlet; 402 system power supply; 406 house-side ECU; 414 switching unit; 416 electrical load; 450 house; 502 resistance circuit; 504, 506, 504, 506 input buffer; 511 power supply node; 512 vehicle ground; 602 oscillation device; 606 electromagnetic coil; 608 leakage detector; 610 CCID control unit; 660 current sensor.

The invention claimed is:

1. A charging system comprising:
a first control device provided in a vehicle for controlling external charging of a power storage device mounted on said vehicle by a power supply outside of the vehicle; and
a second control device provided in a charging apparatus outside of said vehicle for controlling the external charging,
when a reservation for said external charging has been made in both said first control device and said second control device, said external charging being performed by giving the reservation in said second control device a higher priority than the reservation in said first control device, and
when a reservation for said external charging has been made in both said first control device and said second control device, and when the reservation in said first control device has been made at a request based on a state of said vehicle which is different from a request by a user to the first control device, said external charging being performed by giving the reservation in said first control device a higher priority than the reservation in said second control device.

2. A charging system comprising:
a first control device provided in a vehicle for controlling external charging of a power storage device mounted on said vehicle by a power supply outside of the vehicle; and
a second control device provided in a charging apparatus outside of said vehicle for controlling the external charging,
when a reservation for said external charging has been made in both said first control device and said second control device, said external charging being performed by giving the reservation in said second control device a higher priority than the reservation in said first control device, and
when a reservation for said external charging has been made in both said first control device and said second control device, and when the reservation in said first control device has been made before communication between said first control device and said second control device becomes possible, said external charging being performed by giving the reservation in said first control device a higher priority than the reservation in said second control device.

3. The charging system according to claim 1, wherein when the reservation in said first control device is given a higher priority, charging and discharging of said power storage device is allowable within a range where said external charging by the reservation in said first control device can be completed.

4. The charging system according to claim 1, wherein at least one of said vehicle and said charging apparatus is provided with a notification device for making a notification of which one of the reservation in said first control device and the reservation in said second control device has been given a higher priority.

5. A charging system comprising:
a first control device provided in a vehicle for controlling external charging of a power storage device mounted on said vehicle by a power supply outside of the vehicle; and
a second control device provided in a charging apparatus outside of said vehicle for controlling the external charging,
when a reservation for said external charging has been made in both said first control device and said second control device, said external charging being performed by giving the reservation in said second control device a higher priority than the reservation in said first control device, and
when a reservation for said external charging has been made, said first control device canceling the reservation in said first control device while transmitting reservation information to said second control device when communication with said second control device becomes possible.

6. The charging system according to claim 5, wherein said first control device generates said reservation information such that the reservation in said first control device can be distinguished between a reservation based on a request by a user and a reservation based on a state of said vehicle.

7. The charging system according to claim 1, wherein said charging apparatus is part of an electric power management system for adjusting an amount of power used by at least one of a plurality of electrical devices connected to said power supply.

8. A charging reservation method using a first control device provided in a vehicle for controlling external charging of a power storage device mounted on said vehicle by a power supply outside of the vehicle, and a second control device provided in a charging apparatus outside of said vehicle for controlling the external charging, comprising the steps of:
when a reservation for said external charging has been made in both said first control device and said second control device, selecting and giving a higher priority to the reservation in said second control device than the reservation in said first control device;
when a reservation for said external charging has been made in both said first control device and said second control device, and when the reservation in said first control device has been made at a request based on a state of said vehicle which is different from a request by a user to the first control device, selecting and giving a higher priority to the reservation in said first control device than the reservation in said second control device; and
performing said external charging in accordance with the selected reservation.

9. The charging system according to claim 2, wherein when the reservation in said first control device is given a higher priority, charging and discharging of said power storage device is allowable within a range where said external charging by the reservation in said first control device can be completed.

10. A charging reservation method using a first control device provided in a vehicle for controlling external charging of a power storage device mounted on said vehicle by a power supply outside of the vehicle, and a second control device provided in a charging apparatus outside of said vehicle for controlling the external charging, comprising the steps of:
when a reservation for said external charging has been made in both said first control device and said second control device, selecting and giving a higher priority to the reservation in said second control device than the reservation in said first control device;
when a reservation for said external charging has been made in both said first control device and said second control device, and when the reservation in said first control device has been made before communication between said first control device and said second control device becomes possible, selecting and giving a higher priority to the reservation in said first control device than the reservation in said second control device; and
performing said external charging in accordance with the selected reservation.

\* \* \* \* \*